US009414543B2

(12) United States Patent
Dudley et al.

(10) Patent No.: US 9,414,543 B2
(45) Date of Patent: Aug. 16, 2016

(54) EXPANDABLE GATHERING DEVICE WITH REMOVABLE COLLECTION BASKET (71) Applicants: Caleb L. Dudley, Jacksonville, FL (US); Silas M. Dudley, Jacksonville, FL (US)

(72) Inventors: Caleb L. Dudley, Jacksonville, FL (US); Silas M. Dudley, Jacksonville, FL (US)

( * ) Notice: Subject to any disclaimer, the term of this patent is extended or adjusted under 35 U.S.C. 154(b) by 160 days.

(21) Appl. No.: 14/222,347

(22) Filed: Mar. 21, 2014

(65) Prior Publication Data
US 2015/0264865 A1 Sep. 24, 2015

(51) Int. Cl.
*A01D 51/00* (2006.01)
(52) U.S. Cl.
CPC .............. *A01D 51/002* (2013.01); *A01D 51/00* (2013.01)
(58) Field of Classification Search
CPC combination set(s) only.
See application file for complete search history.

(56) References Cited

U.S. PATENT DOCUMENTS

| 2,482,355 | A | * | 9/1949 | McBride | A01D 51/00 171/135 |
| 2,539,596 | A | * | 1/1951 | Smith | A01D 51/002 198/518 |
| 3,518,819 | A | * | 7/1970 | Morris | A01D 51/00 15/179 |
| 4,066,179 | A | * | 1/1978 | Livingston | A63B 47/021 414/440 |
| 4,974,406 | A | * | 12/1990 | Russ | A01D 51/00 172/547 |
| 5,025,620 | A | * | 6/1991 | Dudley | A01D 51/002 414/440 |
| 2002/0041083 | A1 | * | 4/2002 | Britton | B62B 7/044 280/650 |
| 2006/0021318 | A1 | * | 2/2006 | Briesemeister | A01D 51/00 56/328.1 |

* cited by examiner

*Primary Examiner* — Alicia Torres
(74) *Attorney, Agent, or Firm* — Thomas C. Saitta (57) ABSTRACT A gathering device having a pair of brackets interconnected by an axle and a roller assembly, a remover mechanism and cross members. Each bracket has a first side and second side which are mirror images. A removable collection basket is attached to a front portion of the gathering device adjacent to the remover mechanism via a tongue and slot assembly, the slot being on each bracket.

19 Claims, 8 Drawing Sheets

EXPANDABLE GATHERING DEVICE WITH REMOVABLE COLLECTION BASKET

FIELD OF THE DISCLOSURE

The present disclosure relates to gathering devices, and more particularly to expandable rolling devices for picking up small objects (e.g., screws, nuts and bolts, bullet casings, edible and inedible nuts, or the like).

BACKGROUND

Picking up small objects has traditionally been a difficult task. It requires an individual to bend over or squat down constantly and there is little guarantee that the unaided eye will locate all of the objects the individual wishes to pick up.

In many instances it is important to locate and pick up all small objects in an area. Small hardware such as screws, nuts and bolts on airport runways, aircraft carrier decks, warehouse floors, or other industrial settings pose both an injury risk to individuals and a risk to delicate and expensive hardware such as a jet engine which may pick up such small objects, causing damage to interior mechanisms.

Bullet casings are also small and difficult to pick up, however firing ranges must regularly locate and pick up large quantities of bullet casings.

It is equally important to locate and pick up all nuts (e.g., acorns, almonds, walnuts, chestnuts, hickory nuts, hazelnuts, macadamia nuts, pecans, sweet gum balls and the like) around nut trees or in similar areas. Thoroughness in this use case maximizes returns and profitability.

A variety of machines have been developed to pick up such small items. Generally, such machines are large and cumbersome such as those disclosed in U.S. Pat. Nos. 2,679,133; 3,148,493; 4,364,222; 3,387,442; 3,475,889; 3,530,655; 3,579,969; and 3,591,948. These machines are all large production harvesters that might be used for a farm having hundreds of acres of nut trees.

Other devices, such as those disclosed in U.S. Pat. Nos. 5,025,620 and 5,168,692, provide nut harvesters which are manually operable by an individual. While usable by an individual and efficient in small areas, such devices have a defined and limited effective width for picking up small objects, necessitating many passes to pick up all objects in a given area. Furthermore, such devices are limited to only the use they have been designed for (i.e., picking up small items) and are not configured to be readily expandable or adaptable for additional uses. Such devices cannot readily attach to other objects and may tip over when the collection basket is removed.

Given the foregoing, what are needed are expandable and adaptable devices for picking up small items. Furthermore, devices are needed which are expandable but remain manually operable by an individual.

SUMMARY

This summary is provided to introduce a selection of concepts in a simplified form that are further described below in the Detailed Description. It is not intended to identify key features or essential features of the subject matter to be claimed, nor is it intended to be used to limit the scope of the subject matter to be claimed.

The present disclosure is directed to roller devices which pick up small items such as screws, nuts and bolts, bullet casings, nuts, golf balls, pine cones and the like. Devices in accordance with the present disclosure are expandable to include multiple assemblies for picking up small items. Small items are collected in one or more removable collection baskets, enabling efficient disposal or disposition of picked up items.

Gathering devices in accordance with the present disclosure may be manually pushed or pulled or operated by being pushed or pulled by a motor vehicle or other conveyance.

In an aspect, a gathering device includes two triangular brackets spaced apart and interconnected by an axle. A handle extends from and is connected to each bracket. A roller assembly is mounted on the axle for gathering small items as the roller assembly rolls across a surface and a stripper mechanism removes small items from roller assembly and causes them to be deposited into a removable collection basket Further features and advantages of the devices and systems disclosed herein, as well as the structure and operation of various aspects of the present disclosure, are described in detail below with reference to the accompanying figures.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

DETAILED DESCRIPTION

The present disclosure is directed to rolling gathering devices which pick up small items such as screws, nuts and bolts, bullet casings, other nuts, golf balls, pine cones and the like. Devices in accordance with the present disclosure have removable collection baskets which enable rapid adapting of the rolling gathering device and efficient emptying of gathered items.

Figure 1:
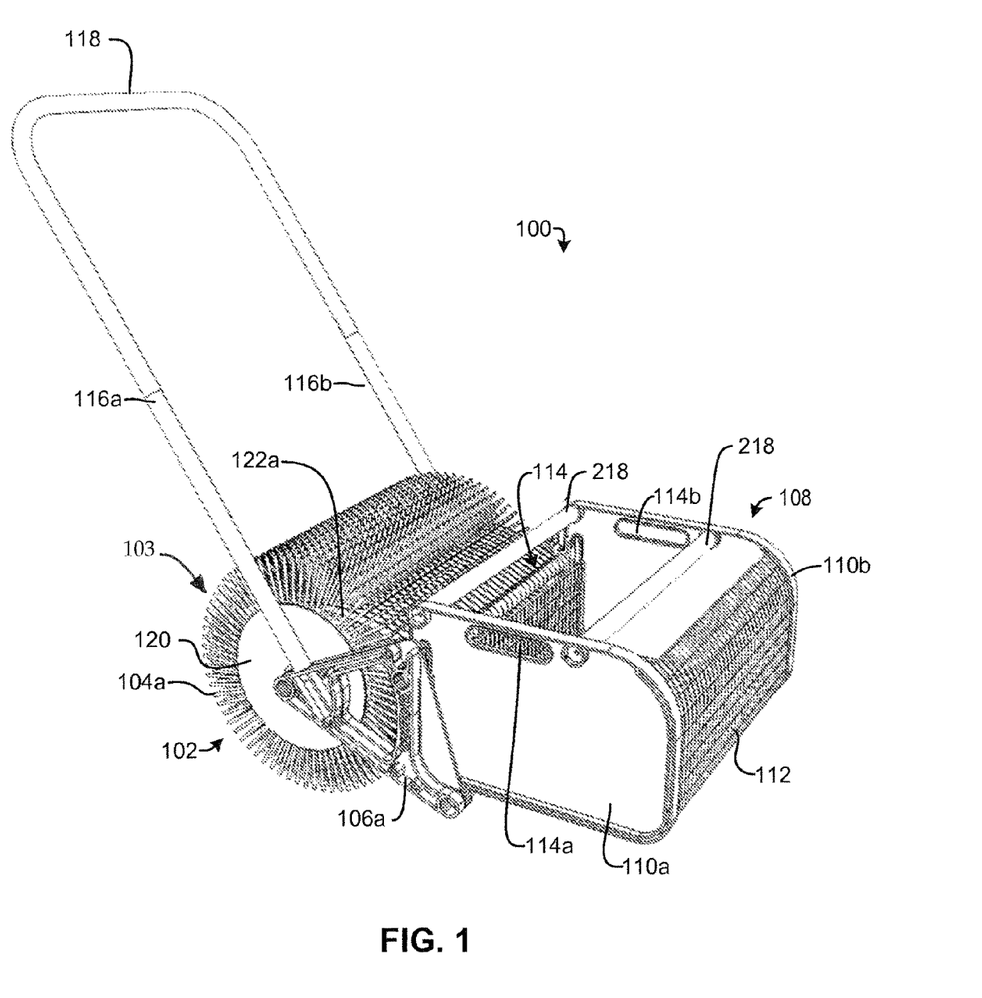
FIG. 1 is a perspective view of a manually maneuverable rolling gathering device, in accordance with an aspect of the present disclosure.
Figure 2:
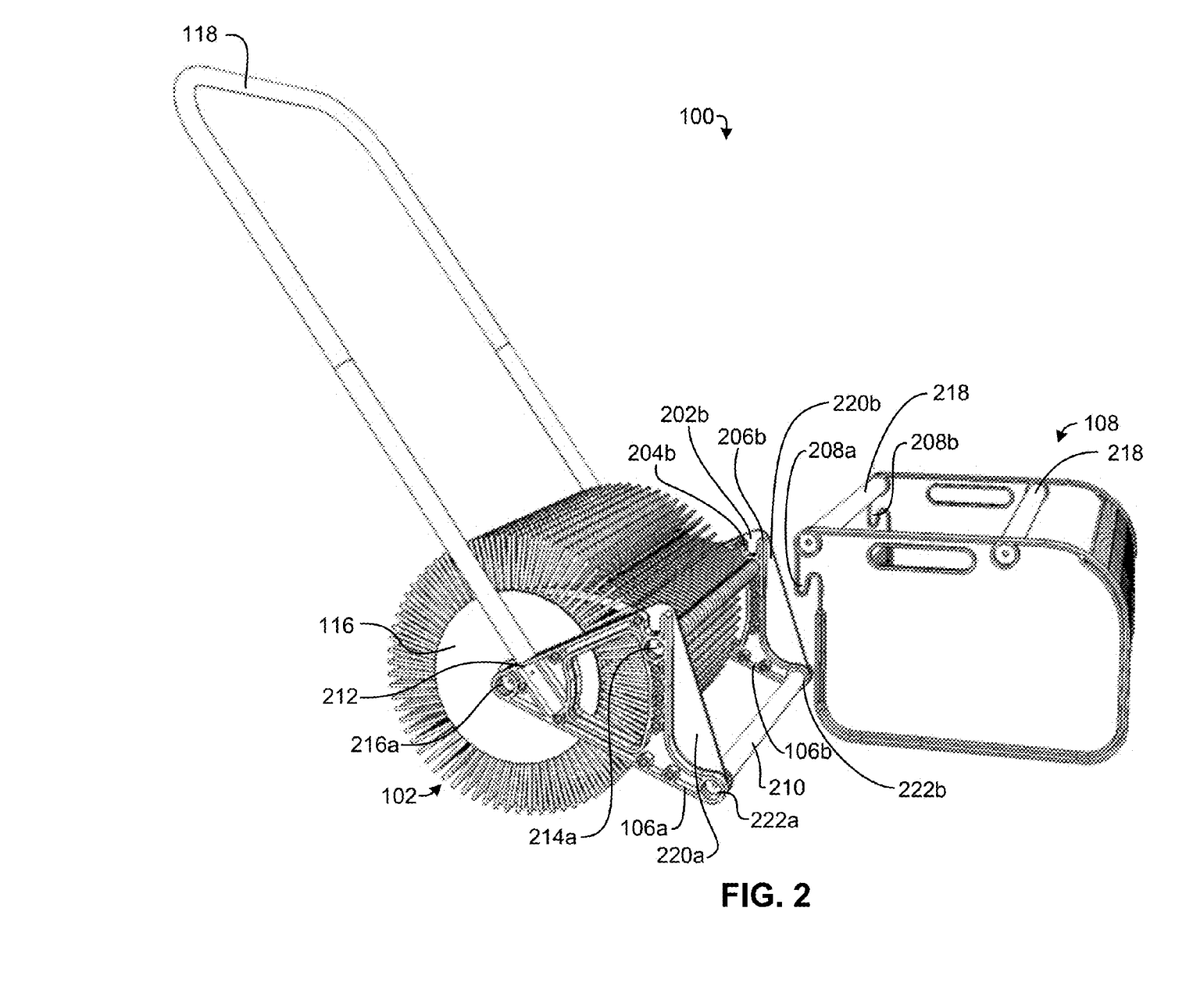
FIG. 2 is a perspective view of the rolling gathering device of FIG. 1, the collection basket being removed.

Referring now to FIG. 1-2, the manually maneuverable rolling gathering device 100 is depicted, in assembled form which is operable for collecting small items off a surface as gathering device 100 is pushed and rolled thereacross. The surface may be the ground, a floor, or another type of terrain. FIG. 2 shows a collection basket 108 being removed from gathering device 100.

Figure 5:
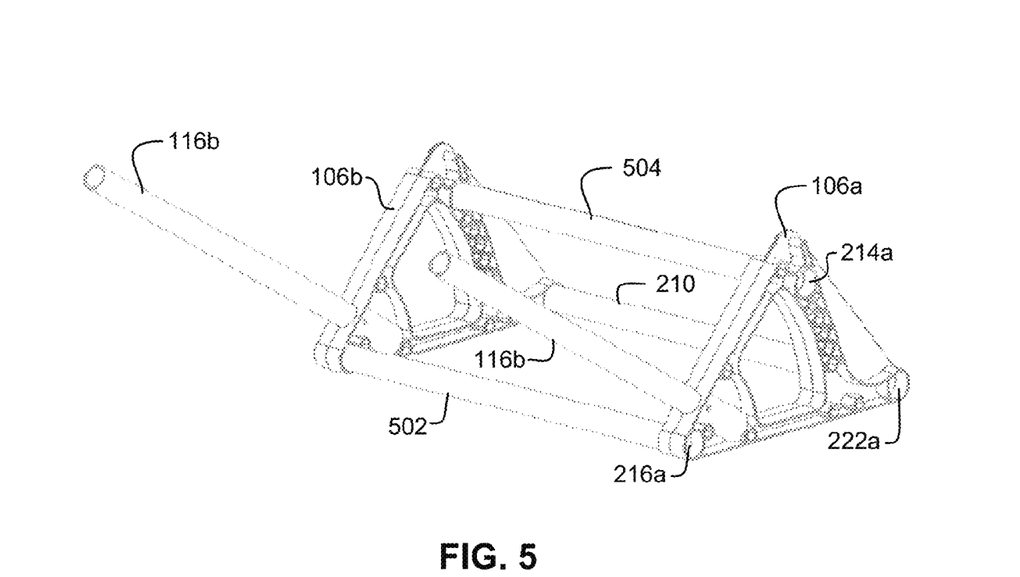
FIG. 5 is a perspective view a partial assembly of rolling gathering device showing an axle cross member, a remover cross member and a lower cross member.

Gathering device 100 includes two brackets 106 (labeled as brackets 106a-b in FIGS. 1-2) spaced laterally apart and interconnected by an axle 502 (see FIG. 5), a handle 118 extending upwards at an acute angle from and connected to each bracket 106, a roller assembly 102 is mounted on axle 502 for gathering small items as roller assembly 102 rolls across a surface, a remover mechanism 114 connected to each bracket 106 at cross member 504 is positioned to remove small items from roller assembly 102 and direct same to a collection basket 108 removably positioned adjacent to remover mechanism 102 such that small items removed from roller assembly 102 fall into collection basket 108.

Roller assembly 102 comprises a plurality of thin wheel units placed side-by-side contiguously on axle 502 with an end plate 120 on each end supported on axle 502. These wheel units are basically of the type disclosed and more fully described in U.S. Pat. No. 5,168,692. Drum 120 includes a central bore for receiving axle 502. Each wheel unit is able to rotate around axle 502 separately and independently from each other.

Each wheel unit 103 includes a plurality of spaced flexible spokes 104 (labelled, for clarity, only as spoke 104a in FIG. 1). Spokes 104 are spaced laterally from one another and pick up small items as rolling assembly 102 rolls over the items by flexibly entraining or squeezing the small item between adjacent spokes 104. In at least the lateral direction, spokes 104 are spaced at least a distance approximately equal to the narrowest dimension of the small item gathering device 100 is designed and configured to pick up. For bullet casings, spokes 104 are laterally spaced from one another a distance approximately equal to the diameter of the bullet casing. For nuts the spacing is approximately equal to the narrowest width of the nut casing, whether the nut casing is oval (pecans), round (walnuts), or another cross section. For golf balls, the spacing is approximately equal to the diameter of a regulation golf ball, namely, 1.68 inches (42.67 mm).

As will be apparent to those skilled in the relevant art(s) after reading the description herein, spacing of spokes 104 need not be precisely adapted for the type or species of small item being gathered because spokes 104 are flexible. It is only necessary that the play between adjacent wheel units, the flexibility of spokes 104, and any other looseness in the structure be sufficient to allow the small items to be jammed between adjacent spokes 104 tightly enough to be restrained there until removed from roller assembly 102 by remover mechanism 114. Spokes 104 may be about 0.1 to about 0.25 inch in diameter and about 1-4 inches in length for most applications. Spokes 104 are slightly flexible so as to accommodate various sizes of small items, but sufficiently stiff to be able to retain a small item between two or more adjacent spokes 104.

Remover mechanism 114 is a large comb-like structure with a plurality of independent separate teeth 122 (labeled, for clarity, only as tooth 122a in FIG. 1) connected to a remover cross member 504. In an aspect, teeth 122 are pivotally connected to cross member 504. Each tooth 122 is positioned between adjacent rows of spokes 104 on adjacent wheel units. This positioning causes small items trapped between spokes 104 on adjacent wheels, or between spokes 104 on the same wheel 103, to be forced out from between spokes 104 as roller assembly 102 rotates. The small items then slide across remover mechanism 114 and into collection basket 108.

Handle 118 allows an individual to push gathering device 100 across a surface in order to gather the small items. Handle 118 is positioned at a height suitable for manual operation of gathering device 100. Handle 118 may include extensions 116 (labeled as extensions 116a-b in FIG. 1) which connect handle 118 to gathering device 100 at handle receivers 212 of bracket 106. Handle 118 and extensions 116 may be telescopic to provide adjustability of the height of handle 118, the position being set by set screws or may be releasably locked together by a common spring loaded button and a plurality of openings, well known in the art.

For each roller assembly 102, gathering device 100 includes a pair of spaced brackets 106. Brackets 106 are interconnected by rigid cross members 502, 504, 210, described herein. In an aspect, cross member 210 also serves as a support and physical stop for collection basket 108 when collection basket 108 is connected to gathering device 100. Bracket 106 is a rigid member having a vertically-oriented slot 202 (labeled as slots 202a-b in FIGS. 2 and 4) positioned adjacent to remover mechanism 114. Slot 202 has an inner wall 204 and an outer wall 206. Slots 202 removably attach a bracket 106 to collection basket 108 by receiving tongue 208 (labeled as tongues 208a-b in FIG. 2). Horizontal rearward and forward movement of tongue 208 within slot 202 is constrained by inner wall 204 and outer wall 206. Horizontal side movement of tongue 208 within slot 202 is constrained by side stop 220 of bracket 106

Figure 6:
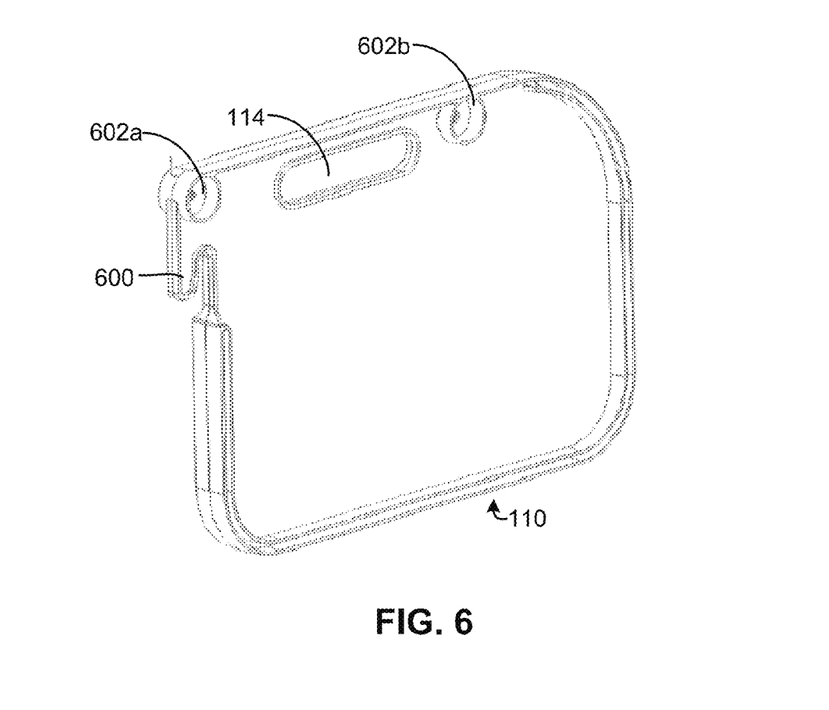
FIG. 6 is a perspective view of a basket side of a rolling gathering device.

Collection basket 108 receives small items from roller assembly 102 after they have been removed from roller assembly 102 by remover mechanism 114. Collection basket 108 has at least one opening positioned adjacent to remover mechanism 114 such that small items may fall into collection basket 108. In an aspect, the opening is adjacent and below remover mechanism 114. Collection basket 108 includes two basket sides 110 (labeled as basket sides 110a-b in FIG. 1) interconnected by basket cross members 218 and wall 112. Cross members 218 connect to basket sides 110 at side receivers 602 (labeled as side receivers 602a-b in FIG. 6). Wall 112 may be a solid member, a mesh, or another member having a plurality of openings. Such openings allow water, undesired small objects, and other materials to escape collection basket 108 while retaining the desired small items. Basket side 110 also includes handle 114 (labeled as handle 114a-b in FIG. 1) configured to allow an individual to easily place, remove, unload or otherwise maneuver collection basket 108. Basket side 110 includes downward facing tongue 208 positioned adjacent the collection basket opening. Tongue 208 is positioned near a top portion of basket side 110. Collection basket 108 is held in place solely by contact between slot 202 and tongue 208, other portions of bracket 106 and contact with cross member 210. In another aspect, cross member 210 may be omitted. In yet another aspect, gathering device 100 further may include one or more locking mechanisms, such as a clip or an elastic cord, positioned to removably connect collection basket 108 to gathering device 100.

Slot 202 is positioned at an upper front portion of bracket 106, allows for quick removal of collection basket 108. Bracket 106 further includes a side stop 220 extending forward and beyond slot 202. Side stop 220 physically limits the lateral side movement of collection basket 108 when attached to bracket 106. Side stop 220 also facilitates alignment of collection basket 108 when collection basket 108 is attached. In an aspect, side stop 220 is a rigid portion of bracket 106 sloping downward and out from a point adjacent to outer wall 206.

Figure 10:
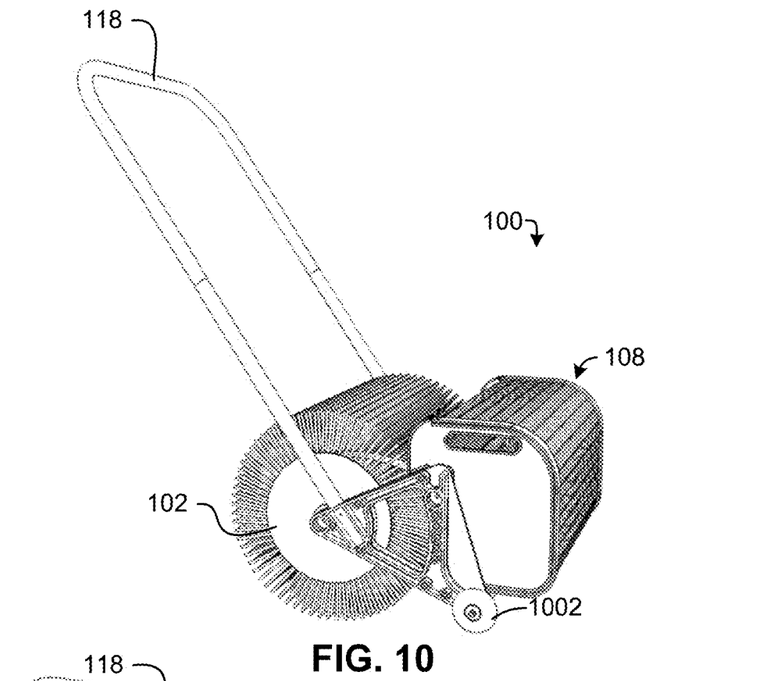
FIG. 10 is a front perspective view of the rolling gathering device having a narrow collection basket and a pair of basket support wheels.
Figure 11:
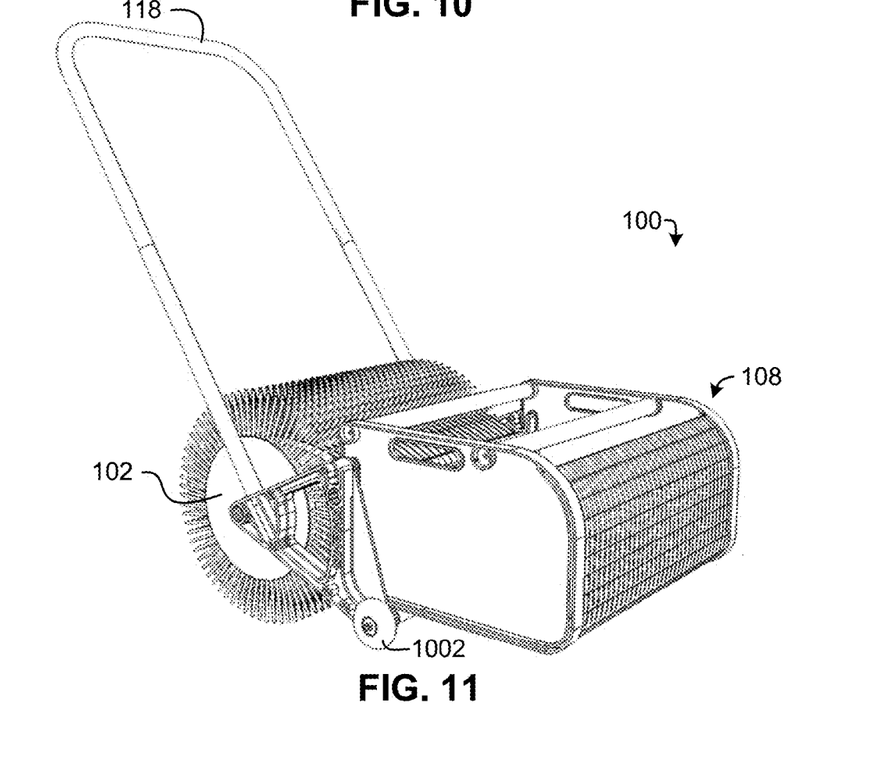
FIG. 11 is a front perspective view of a rolling gathering device having a larger collection basket which may also have the wheels of FIG. 10.

Via slot 202 and other portions, bracket 106 enables gathering device 100 to connect to collection baskets 108 of various dimensions. As shown in FIGS. 10 & 11, collection basket 108 may have a narrow profile or a wider profile provided that collection basket 108 includes a pair of spaced tongues 208.

In an aspect, helper or basket support spaced wheels, including 1002, are rotatably connected to bracket 106 at receivers 222a,b positioned to provide additional stabilizing contact and enhanced maneuverability and decreased wear of the gathering device 100 with the surface being traversed.

Figure 3:
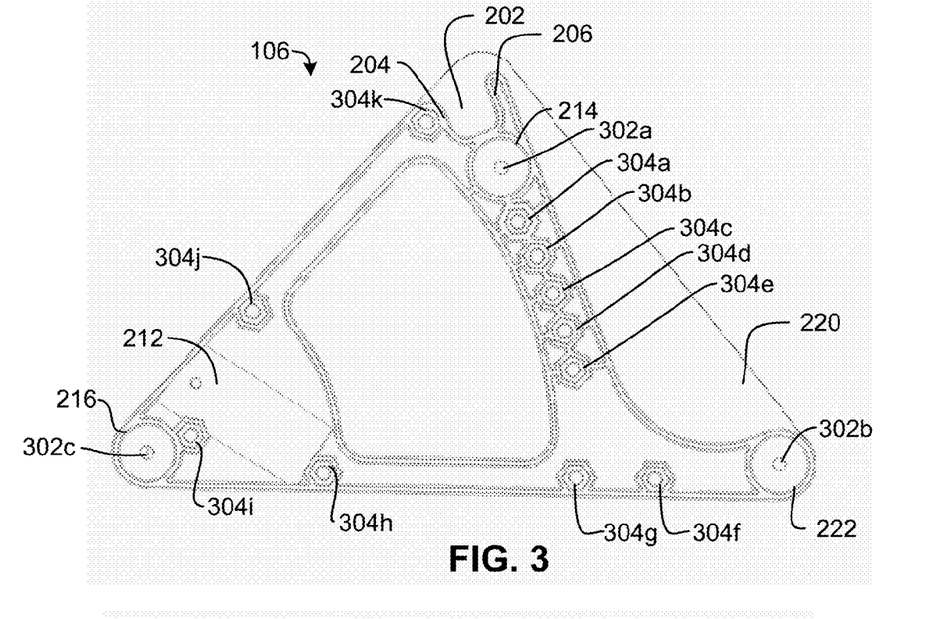
FIG. 3 is a side elevational view of a bracket of the rolling gathering device of FIG. 1 the opposite side being the mirror image thereof.
Figure 4:
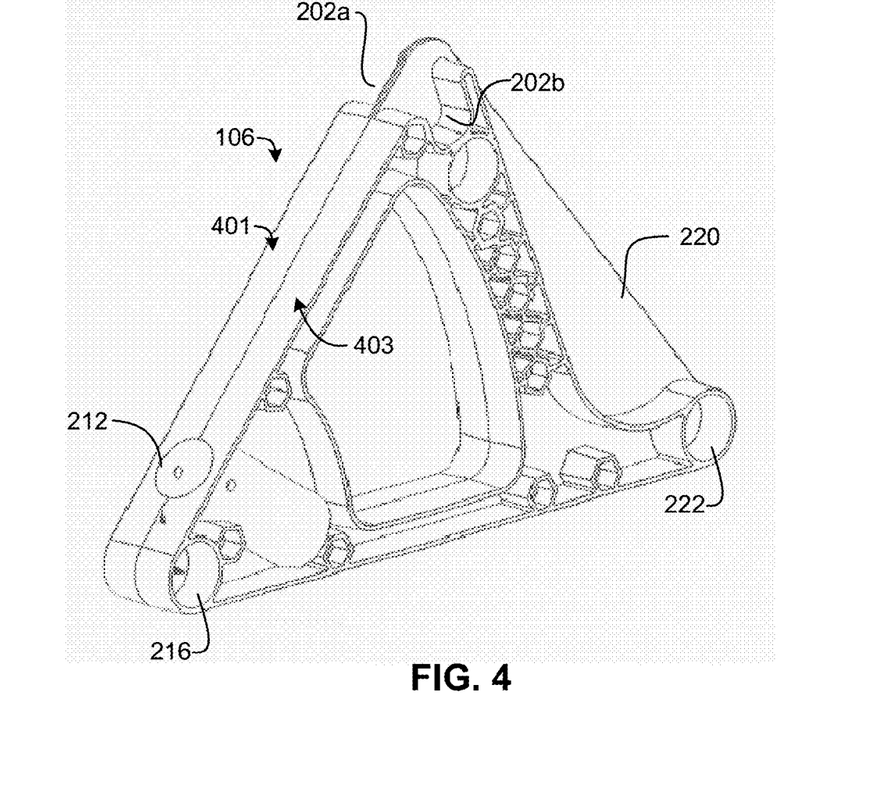
FIG. 4 is a perspective view of the bracket of FIG. 3.

Referring now to FIGS. 3 & 4, views of bracket 106 in accordance with various aspects of the present disclosure are shown. Bracket 106 is an integral molded and triangular member. Bracket 106 includes a plurality of sockets 304 (labeled as sockets 304a-k in FIG. 3). Sockets 304 are hexagonal receivers including a socket center bore for receiving a nut having a plurality of sides, thereby enabling attachment of one or more additional portions, accessories, and the like which will be apparent to those skilled in the relevant art(s) after reading the description herein. A bolt may be inserted into a nut positioned within socket directly or the bolt may be inserted into the nut by passing through the socket center bore. Socket 304l provides an attachment location for, for example, the pulling handle 902 by which the forward end of such handle may be adjusted upwardly in the direction of arrow 903, thus locating the forward connection of handle 902 in one of the sockets 304 a-e and possibly in sockets 304g or k, all such sockets being on a radius from socket 304i.

Axle 502 connects to bracket 106 at a rear receiver 216. Cross member 210 connects to bracket 106 at a forward receiver 222. Each one of rear receiver 216. upper receiver 214 and forward receiver 222 is a cylindrical recess having a center bore 302 for receiving a bolt or similar member. Center bore 302 may have a small diameter relative to the inner diameter of receiver 214, 216, 222 enabling another portion to be anchored to bracket 106 via the insertion of a bolt or similar member. Center bore 302 may have another diameter, including a diameter equal to the inner diameter of receiver 214, 216, 222 thereby allowing a cross member to pass through center bore 302.

As shown in FIG. 4, bracket sides are mirror images. A first side 401 and a second side 403 comprise similar sockets 304, slots 202 and receivers 214, 216, 222 thereby enabling bracket 106 to connect to other portions of gathering device 100 from either side. Thus, gathering device 106 is expandable to include a multiple roller assemblies 102, remover assemblies 114, collection baskets 108 and the like.

Figure 7:
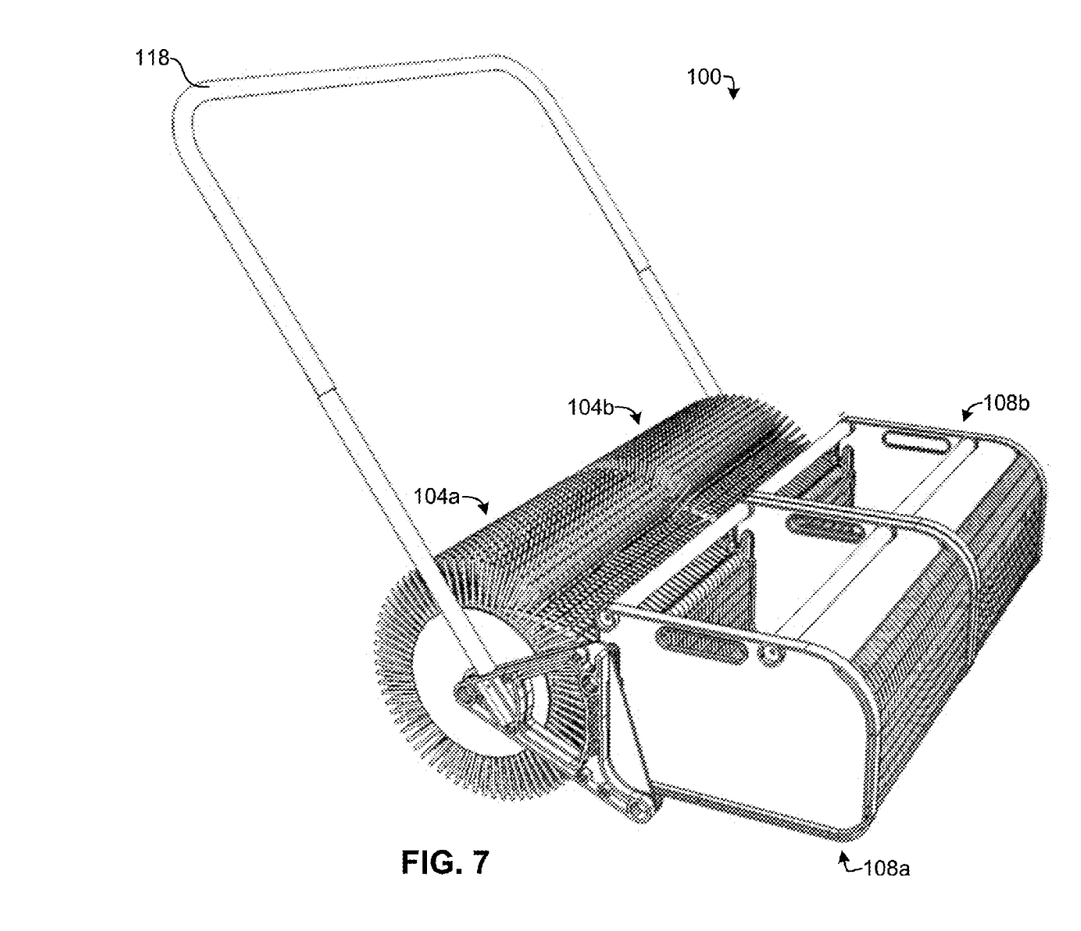
FIG. 7 is a perspective view of a rolling gathering device having a pair of roller assemblies ganged together and two collection baskets.
Figure 8:
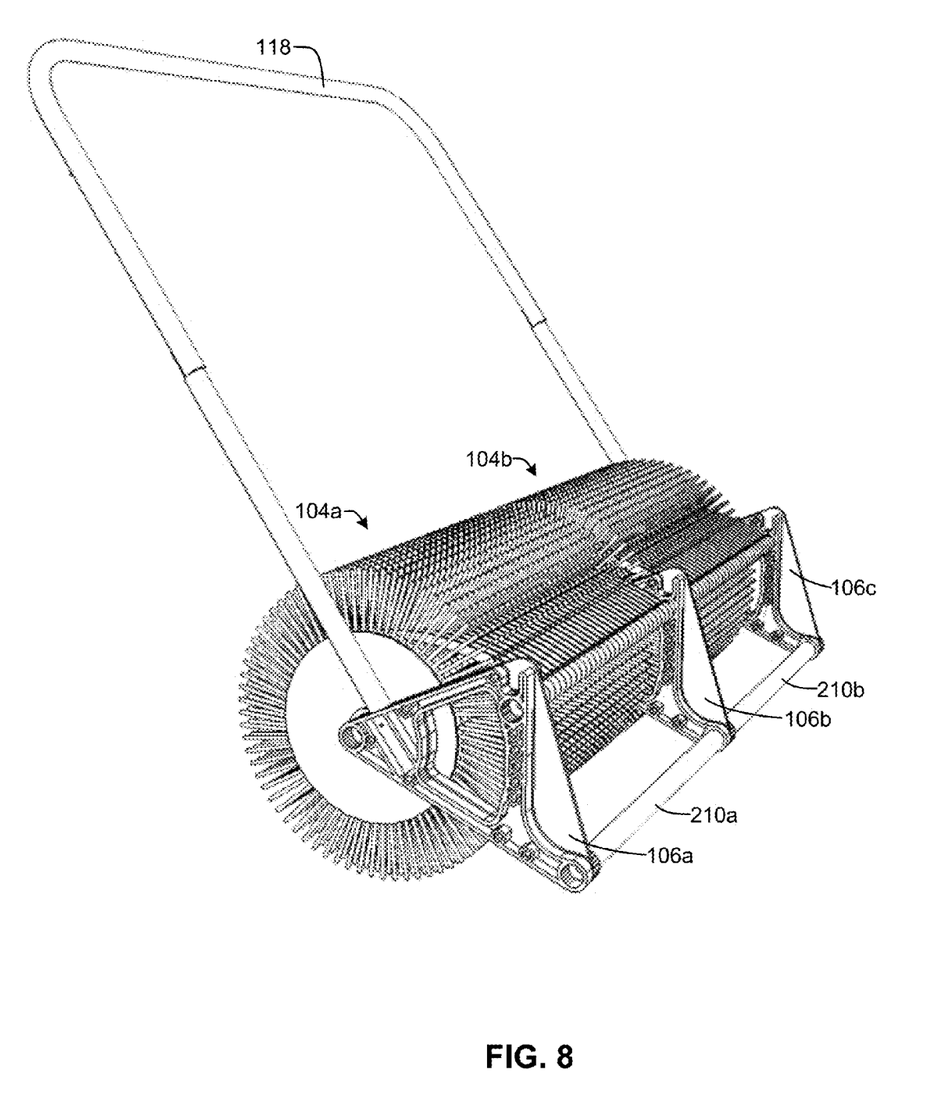
FIG. 8 is a perspective view of the rolling gathering device of FIG. 7, the collection baskets being removed.

As shown in FIGS. 7 & 8, gathering device may include three brackets 106, two roller assemblies 102, two remover assemblies 114, and two collection baskets 108. Handle 118 connects the two outer brackets 106 enabling one individual or multiple individuals to push gathering device 100. Gathering devices 100 in accordance with the present disclosure may also be driven by a motor vehicle. When two of the roller assemblies 114 are gauged together, preferably the middle bracket 106 has receivers 214, 216 and 222 drilled out so that the cross members 504, 502 and 210 may be continuous to provide enhanced rigidity and structurally integrity to the gathering device 100.

Figure 9:
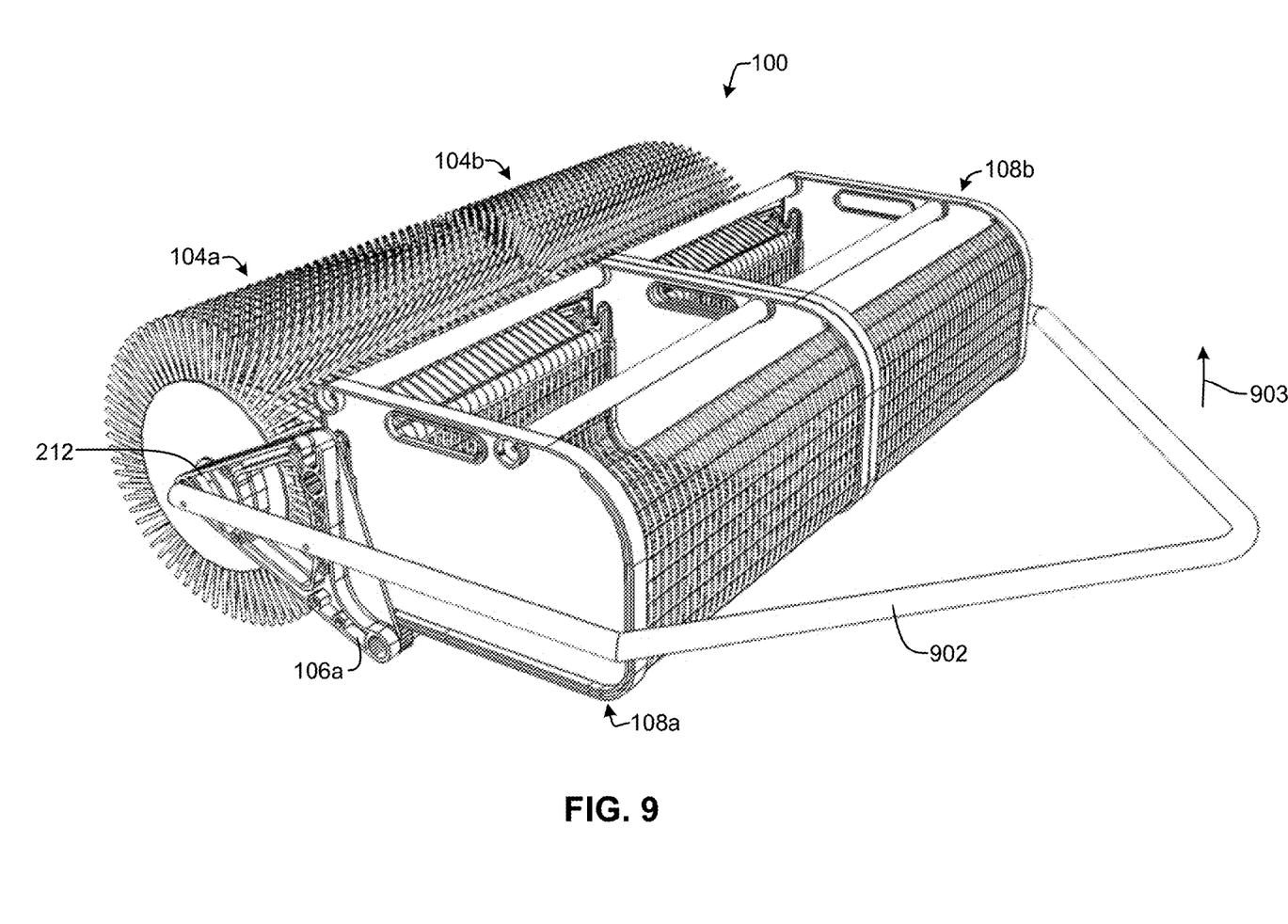
FIG. 9 is a perspective view of a rolling gathering device configured to be pulled during operation.

As shown in FIG. 9, gathering device 100 is configurable for operation while being pulled. In an aspect, handle 118 may be removed or omitted and a puller bar 902 attached to gathering device 100 at one or more sockets 302. In such a configuration, gathering device 100 may be pulled behind a motor vehicle.

While various aspects of the present disclosure have been described above, it should be understood that they have been presented by way of example and not limitation. It will be apparent to persons skilled in the relevant art(s) that various changes in form and detail can be made without departing from the spirit and scope of the present disclosure. The present disclosure should not be limited by any of the above described aspects, but should be defined only in accordance with the following claims and their equivalents.

In addition, it should be understood that the figures, which highlight the structure, methodology, functionality and advantages of the present disclosure, are presented as examples only. The present disclosure is sufficiently flexible and configurable, such that it may be implemented in ways other than that shown in the accompanying figures.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What is claimed is:

1. A gathering device for picking up small items, the gathering device comprising:
   a removable collection basket including a first basket side and a second basket side spaced laterally apart and interconnected by a basket wall, the basket wall having a collection basket opening, each of the basket sides including a basket side tongue downwardly oriented and positioned at an upper rear basket side portion;
   a first integral bracket and a second integral bracket spaced laterally apart, the brackets being vertically oriented, and including facing bracket sides, rear receivers connected to an elongate axle, the brackets having upper receivers connected to a remover mechanism elongate cross member, the brackets having lower receivers connected to an elongate cross member, the brackets having slots removably receiving and connecting to the corresponding basket side tongue, each bracket further including another bracket side, the another bracket side being a mirror image of each facing bracket side;
   each of the brackets having a side stop extending outward of the slot for constraining lateral movement of the collection basket;
   a handle connected to said brackets;
   a roller assembly positioned between the facing brackets and rotatably connected to the axle, the roller assembly including a plurality of wheels formed by a plurality of flexible spokes for picking up small items therebetween, each of the wheels being independently rotatable; and
   a remover mechanism having the remover mechanism elongate cross member and a plurality of independent teeth pivotally connected to the remover mechanism cross member, the teeth extending respectively between adjacent two of the wheels of flexible spokes for stripping small items from between the plurality of wheels of flexible spokes, the plurality of teeth being located adjacent to the collection basket opening for directing small items into the collection basket.

2. The gathering device of claim 1, wherein the collection basket opening is positioned adjacent and below the plurality of teeth.

3. The gathering device of claim 1, the facing brackets further include respective handle receivers, and wherein the handle is a U-shaped handle having free ends connected to respective handle receivers.

4. The gathering device of claim 3, wherein the handle has a pair of spaced legs that are telescopic to adjust the height of the handle.

5. The gathering device of claim 1, wherein the remover cross member is located forwardly of the elongate axle.

6. The gathering device of claim 1, wherein the handle is located rearward of the elongate axle.

7. The gathering device of claim 1, wherein the handle is attached to the brackets and is located forwardly of the elongate axle.

8. The gathering device of claim 7, the handle having an upper end, lower end portions and forward connections, wherein each bracket includes a plurality of sockets, one of said sockets being an attachment socket for one of the lower end portions of the handle and a group of the sockets being forwardly spaced from the attachment socket, the forward connections of the handle being connectable to any of the forwardly spaced sockets to provide height adjustment to the upper end of the handle.

9. The gathering device of claim 1, further comprising:
another removable collection basket identical to the collection basket,
a third bracket spaced laterally from one of the first and second brackets, the third bracket being vertically oriented, the third bracket having on a first bracket side a rear receiver connected to a second axle, an upper receiver connected to another remover mechanism cross member, and a lower receiver connected to another cross member, a slot removably connectable to the another basket side tongue;
the third bracket having a side stop extending outward of its slot for constraining lateral movement of the another collection basket;
another roller assembly identical to the roller assembly positioned between the one bracket and the third bracket, and being rotatably connected to the second axle;
another plurality of independent teeth identical to the independent teeth connected to the another remover mechanism cross member, and respectively extending between the wheels of the another roller assembly for stripping small items from between the another roller assembly plurality of wheels of flexible spokes, the another plurality of teeth being located adjacent to the another collection basket opening for directing small items stripped therefrom into the another collection basket; and
each of the axles and cross members being unitary and continuous and passing through the receivers of the one bracket and terminating in the receivers of the third bracket and the receivers of another of the facing brackets.

10. The gathering device of claim 1, wherein each of the brackets further includes a plurality of spaced sockets.

11. The gathering device of claim 10, wherein each of the plurality of spaced sockets is a hexagonal recess.

12. The gathering device of claim 1, wherein the facing brackets are each triangular shaped members.

13. The gathering device of claim 1, wherein the first basket side and the second basket side each include a carrying handle.

14. The gathering device of claim 13, wherein the carrying handle is an elongated slotted opening.

15. The gathering device of claim 1, wherein at least a portion of the basket wall between the first and second basket sides includes a plurality of openings arranged in a grid pattern.

16. The gathering device of claim 1, further includes a pair of small wheels respectively attached to the facing brackets, the wheels being located outboard and adjacent the basket.

17. A gathering device for picking up small items, the gathering device comprising:
a removable collection basket including a first basket side and a second basket side spaced laterally apart and interconnected by a basket wall, the basket wall having a collection basket opening, each basket side including a basket side tongue downwardly oriented and positioned at an upper rear basket side portion;
a first integrally molded bracket and a second integrally molded bracket spaced laterally apart, each of the brackets being vertically oriented, and including bracket facing sides and having a rear receiver connected to an elongate axle of the device, an upper receiver connected to a remover mechanism cross member, and having a lower receiver connected to an elongate cross member, each of the brackets respectively having a slot removably receiving and connecting to the respective basket side tongue, and a plurality of spaced sockets, each bracket further including another bracket side, the another bracket side being a mirror image of each facing bracket side, each bracket side having a side stop extending outward of the slot for constraining lateral movement of the tongues in the slots;
a roller assembly positioned between the facing bracket sides and rotatably connected to the axle, the roller assembly including a plurality of wheels formed by a plurality of flexible and resilient spokes for picking up small items therebetween, each of the wheels being independently rotatable,
a handle connected to and between the brackets; and
a plurality independent teeth pivotally connected to the remover mechanism cross member, in front of the axle, the teeth respectively extending between two of the wheels adjacent each other for stripping small items from between the plurality of wheels and between spokes on each of the wheels, the teeth having free ends riding on the wheels and the opposite ends thereof being adjacent to the collection basket opening for directing small items captured by the wheels into the collection basket.

18. The gathering device of claim 17, further comprising:
another removable collection basket identical to the collection basket,
a third bracket spaced laterally from one of the first and second brackets, the third bracket being vertically oriented, the third bracket having on a first bracket side a rear receiver connected to a second axle, an upper receiver connected to another remover mechanism cross member, and a lower receiver connected to another cross member, a slot removably connectable to the another basket side tongue;
the third bracket having a side stop extending outward of its slot for constraining lateral movement of the another collection basket,
another roller assembly identical to the roller assembly positioned between the one bracket and the another bracket, and rotatably connected to the second axle;
another plurality of independent teeth identical to the independent teeth connected to the another remover mechanism cross member, and respectively extending between the wheels of the another roller assembly for stripping small items entrained between the another roller assembly plurality of wheels of flexible spokes or between spokes on the same wheel, the another plurality of teeth being located adjacent to the another collection basket opening for directing small items into the another collection basket; and each of the axles and cross members being unitary and continuous and passing through the receivers of the one bracket and terminating in the receivers of third bracket and the receivers of another of the facing brackets.

19. A gathering device for picking up small items, the gathering device comprising:

a collection basket having an elongate opening;

a first integrally molded bracket and a second integrally molded bracket spaced laterally apart, each bracket being vertically oriented and having facing sides and a rear receiver connected to an elongate axle extending between the facing sides, an upper receiver connected to an elongate forward remover mechanism cross member, a lower receiver connected to an elongate lower cross member, each of the brackets having a slot for removably receiving a connecting portion of the collection basket, and a plurality of spaced sockets, each bracket further including a second bracket side being a mirror image of the first bracket side, and a side stop respectively adjacent each of the slots extending outward thereof for constraining lateral movement of the connecting portion and the collection basket;

a roller assembly positioned between the first bracket and the second bracket and rotatably connected to the axle, the roller assembly including a plurality of wheels of flexible and resilient spokes for picking up small items therebetween; and a plurality of teeth pivotally connected to the remover mechanism cross member, and having one end portion extending between adjacent two of the wheels for stripping small items from between the adjacent wheels, the plurality of teeth having their opposite end portions positioned adjacent to the elongate opening for directing small items into the collection basket;

wherein the collection basket is removable from the device and includes a first basket side and a second basket side spaced laterally apart and interconnected by a basket wall, the collection basket opening being adjacent an upper and forward end of the collection basket to receive directed small items from the roller assembly, the connecting portion including a basket side tongue downwardly oriented and located at an upper rear basket side portion and respectively insertable into the slots of the brackets, and each basket side having a hand hold for gripping by a user to empty same.

* * * * *